March 7, 1944.  T. A. DUNAGAN  2,343,498
TIRE RECAP
Filed April 21, 1942
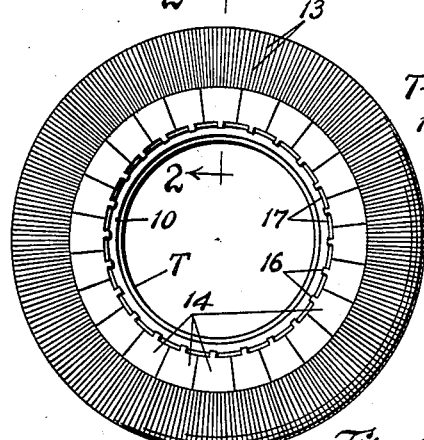
Fig. 1
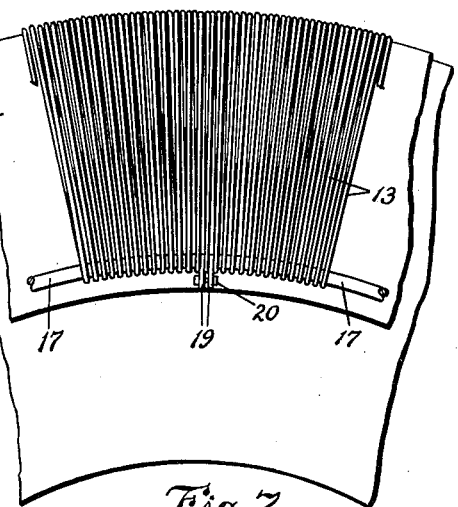
Fig. 7
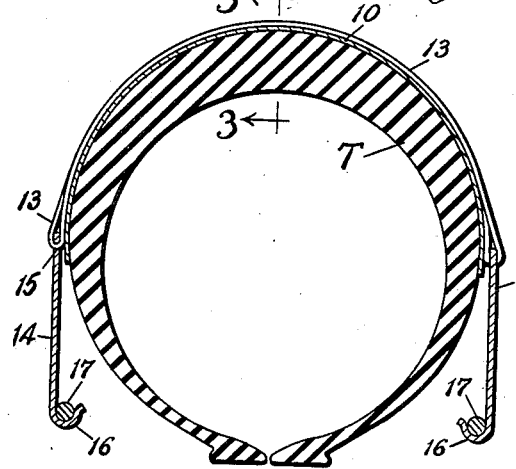
Fig. 2
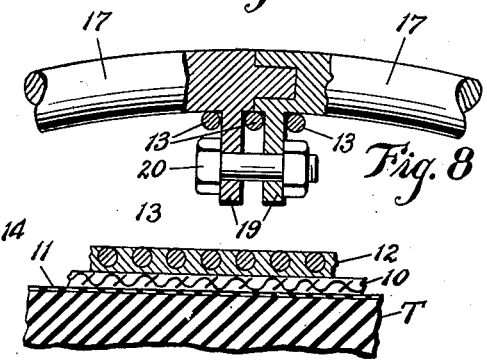
Fig. 8
Fig. 3
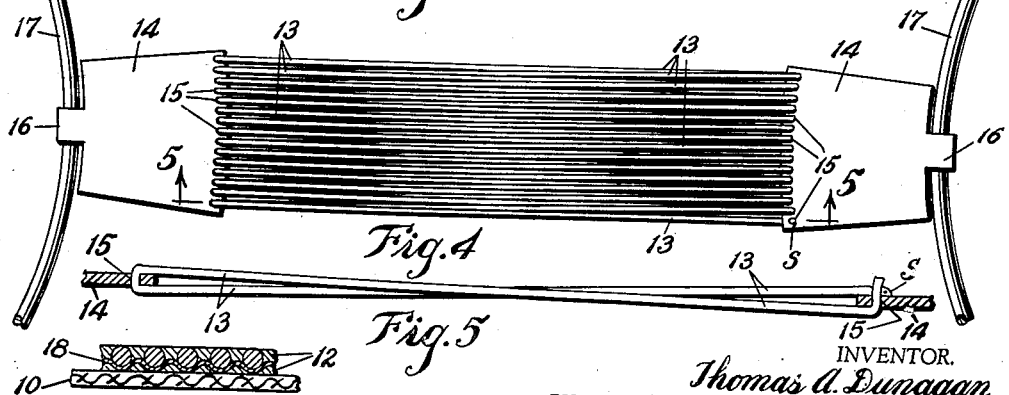
Fig. 4
Fig. 5
Fig. 6
INVENTOR.
Thomas A. Dunagan
BY Henry Motz
ATTORNEY.

Patented Mar. 7, 1944

2,343,498

UNITED STATES PATENT OFFICE 2,343,498

TIRE RECAP

Thomas A. Dunagan, Montrose, Calif.

Application April 21, 1942, Serial No. 439,911

2 Claims. (Cl. 152—177)

The primary object of the present invention is to provide a tire recap for tires, and this especially for tires of the motor vehicle type, regardless of purpose or use.

An object of the present invention is to provide a protective device to be superimposed on vehicle tires of every description, and on pneumatic tires in particular.

A further object of the invention is to provide a tire recap adaptable for capping both new and used tires regardless of condition.

A further object of the invention is to provide a tire recap capable of withstanding road surface variations and conditions; impervious to water, oils and greases, and repellent against stone and other commonly experience bruises.

A further object of the invention is to provide a tire recap which may be manufactured in sectional segments so as to readily permit the replacement of worn sections without the necessity of removing for repairs, or discarding the entire recap.

A still further object of the invention is to provide a tire recap that will repel bullets and other projectiles contacting the same.

And a further object of the invention is to provide a tire recap the use of which, in connection with pneumatic tires in common use on motor vehicles, aircraft and army vehicles of all description, offers no perceptible riding discomfort to the occupants of the vehicle, and no driving difficulties.

I attain these objects by the tire recap illustrated in the accompanying drawing, in which:

Figure 1 is a side elevation of the invention as applied to a tire;

Figure 2 is a section on line 2—2 of Fig. 1;

Figure 3 is a section on line 3—3 of Fig. 2;

Figure 4 is a plan view of a recap section shown in a flat extended position for illustration purposes, and showing the novel up and under, and in between placement of the metal cable formation;

Figure 5 is a section on line 5—5 of Fig. 4;

Figure 6 is a section similar to Fig. 3, but showing a modification of the invention;

Figure 7 is a fragmentary side elevation of another modification of the invention, and Figure 8 is an enlarged detail view of the coupling shown on a much smaller scale in Fig. 7.

Similar letters and numerals indicate like parts throughout the several views, thus the numeral 10 indicates a layer of suitable fabric such as canvas, for example, which is cemented to the tire carcass T by means of rubber cement 11 or a suitable substitute, petroleum varnish, for example.

A petroleum varnish coating designated as at 12, or a similar protective adhesive filler is applied to the exposed surface of the fabric 10 to provide a bed or foundation for a flexible member 13 in the form of a metallized rope, wire or cable tightly bound about the prepared tire carcass at right angles to the axis of a tire section as seen in Fig. 2, to form a protective recap or covering, in a manner hereinafter more specifically described. The member 13 may comprise a flexible metal cable, or wire, or any other suitable wear resisting and tire protective strip.

In one form of the invention, the recap consists of adjacent sections embodying a pair of keystone shaped metal plates 14, each having a plurality of perforations 15 through which is threaded the flexible cable 13 having the ends thereof affixed as by soldering as at S in the respective perforations, and thereby connecting the pair of plates. The series of plates provide annular anchors for the cable on opposite sides of the tire.

Each plate 14 is provided with a portion shaped in a hook 16 and providing a means of connection to a pair of annular members or rings 17, one thereof on each side of the carcass T, and thereby binding the recap form about the carcass, after which the former has applied thereto a heavier application or layer of petroleum varnish as at 12, or other similar protective material as best shown in Fig. 3. It should be noted that the flexible member or cable 13 is wound back and forth transversely over the tread and side wall portions of the tire with adjacent windings crossing and lying in closely spaced relation to one another as best shown in Figs. 4 and 5 respectively, thus forming a "woven" flexible and protective cap or covering for the tire.

The petroleum varnish employed consists of a thick fluidic viscid product having high resistance to heat and affording somewhat of a cushioning action. It may be smeared thereon, or the prepared tire may be dipped therein. It is applied so as to thoroughly penetrate and fill the spaced portions between the cable proper, and helps to bind the latter together so that they cannot shift their position, and also presents a smoothly finished recap of resilient riding qualities.

A modification of the above described construction is the application of strips of corrugated metal 18 between the petroleum varnish coated fabric 10, and the applied cable 13, as shown best in Fig. 6.

A further modification of the invention may eliminate the plates 14, the cable member 13 being wrapped around the annular members or rings 17 which may be formed into dovetailing segments having lugs 19 and bolts 20 for connecting one segment with another as detailed in Fig. 8.

In said modification, the respective segments or recap sections may be constructed to completely encompass a tire carcass with quarter sections, one-third sections, one-half sections, or of such other sizes as convenience and desirability might best indicate.

From the foregoing, it should be apparent that the tire recap may be constructed as a single unit to encompass the tire carcass, whether new or used, or in sectional units; that it may be constructed with or without side plates, the latter when employed, effectively repelling side damage of various nature. In either case, that its attachment to the tire is dependable and readily accomplished by merely applying to the tire so as to properly encompass the same, and then securely fastening the described holder means.

While it is not claimed that the recap described as my invention will provide as comfortable a ride as the ordinary tire in use, it is confidentally believed that it will serve as an effective means for tire conservation, and this without seriously interfering with riding comfort, appearance and travel speed.

The single unit may readily be repaired as the need may arise, while the sectional units furnish ready replacement sections for like purposes.

While the invention is primarily adaptable to the conservation of tires during the present war emergency with its resultant tire shortage, the invention warrants serious consideration for permanent adoption in many avenues of service, particularly for travel under unimproved road conditions where travel is both difficult and hazardous when using the ordinary unprotected tire, especially of the pneumatic type.

If a tire regardless how badly it may be worn will hold air at all, my tire recap may be conveniently used and it will perform its function in a highly satisfactory manner.

Staunchly constructed and adding no objectionable weight, inconspicuous in appearance, the invention offers a reliable tire recap. Moreover, it may be constructed of materials the market affords, and at no great cost.

I am aware that slight modifications in structure and substitutes for the material herein set forth may from time to time be made without departing, however, from the scope of the present invention, and as defined in the claims which are appended hereto. Hence, I do not limit my present invention to the exact description herein disclosed, but what I do claim is:

1. In a protective device for vehicle tires, annular members adapted to be applied on the sides of the tire inwardly spaced from the tread thereof, and a flexible member wound back and forth between and connected to said members to provide a plurality of closely spaced windings covering the tread and side wall portions of the tire as a protective cap therefor, a fabric wrapping interposed between said windings and the tire, and a bed of resilient adhesive material on said wrapping for adhering the windings and filling the spaces therebetween and leaving bared the outer surface of said windings.

2. In a protective device for vehicle tires, annular members adapted to be applied on the sides of the tire inwardly spaced from the tread thereof, and a flexible member wound back and forth between and connected to said members to provide a plurality of closely spaced windings covering the tread and side wall portions of the tire as a protective cap therefor, a bed of elastic adhesive material lying between the tire and said windings and filling the spaces between said windings and a metallic corrugated sheet in said bed and beneath said windings.

THOMAS A. DUNAGAN.